US008767267B2

(12) United States Patent
Yanagi

(10) Patent No.: US 8,767,267 B2
(45) Date of Patent: Jul. 1, 2014

(54) PRINT METHOD AND PRINT APPARATUS

(75) Inventor: Haruyuki Yanagi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1516 days.

(21) Appl. No.: 11/199,160

(22) Filed: Aug. 9, 2005

(65) Prior Publication Data

US 2006/0033943 A1 Feb. 16, 2006

(30) Foreign Application Priority Data

Aug. 12, 2004 (JP) ................................ 2004-235580

(51) Int. Cl.
*G06T 5/00* (2006.01)
*G03G 15/23* (2006.01)

(52) U.S. Cl.
CPC .... *G03G 15/231* (2013.01); *G03G 2215/00734* (2013.01); *G03G 2215/00594* (2013.01)
USPC .......... 358/3.26; 358/504; 358/1.9; 358/3.27; 399/301

(58) Field of Classification Search
USPC ........ 358/518, 3.23, 530, 523–525, 1.13, 1.1, 358/1.14, 1.15, 1.9
See application file for complete search history.

(56) References Cited

U.S. PATENT DOCUMENTS 5,348,283 A 9/1994 Yanagi et al. ................. 271/127
5,370,380 A 12/1994 Suzuki et al. ................... 271/21
5,580,042 A 12/1996 Taniguro et al. .............. 271/274
5,620,174 A 4/1997 Taniguro et al. ........... 271/10.12
5,648,808 A 7/1997 Yanagi et al. ................. 347/104
5,672,019 A 9/1997 Hiramatsu et al. ............ 400/624
5,725,319 A 3/1998 Saito et al. ..................... 400/629
5,726,772 A * 3/1998 Parker et al. ................. 358/3.19
5,918,873 A 7/1999 Saito et al. ................. 271/10.11
6,168,270 B1 1/2001 Saikawa et al. ............... 347/104
6,276,680 B1 8/2001 Sonoda et al. ................ 271/273
6,305,682 B1 10/2001 Saito et al. ................. 271/10.11
6,331,002 B1 12/2001 Yoshino et al. ............... 271/117
6,382,857 B1 5/2002 Yanagi et al. ................. 400/636
6,591,076 B2 * 7/2003 Connors ....................... 399/194
6,874,778 B2 4/2005 Nakano et al. ................ 271/111
6,877,737 B2 4/2005 Yanagi et al. ................. 271/121
6,900,611 B2 5/2005 Yoshino et al. ............... 318/696
6,939,064 B2 9/2005 Kawaguchi et al. .......... 400/283
2003/0053096 A1 * 3/2003 Nagata ........................... 358/1.9
2003/0063152 A1 * 4/2003 Edamura et al. ................ 347/36
2003/0099526 A1 * 5/2003 Saw et al. ........................ 412/19
2004/0141041 A1 * 7/2004 Tsutsumi et al. ............. 347/102
2004/0234312 A1 * 11/2004 Woods ............................ 400/76

FOREIGN PATENT DOCUMENTS

JP 6-183068 7/1994
JP 2003-177898 6/2003

* cited by examiner

*Primary Examiner* — Barbara Reinier
*Assistant Examiner* — Brendan McCommas
(74) *Attorney, Agent, or Firm* — Fitzpatrick, Cella, Harper & Scinto

(57) ABSTRACT

According to the present invention, to perform double-sided printing or marginless printing, overall image data consonant with an area that includes an area on a print medium and an overrun area are generated based on information concerning the size of the print medium and information concerning the overrun distances. To generate image data, the image data are prepared for both one side of the print medium and the other side of the print medium, so that, relative to the print medium, the position of the image data corresponding to one side matches the position, relative to the print medium, of the image data corresponding to the other side.

15 Claims, 12 Drawing Sheets

PRINT METHOD AND PRINT APPARATUS

BACKGROUND OF THE INVENTION

1. Field of the Invention

The present invention relates to a print method and a print apparatus for printing an image on the obverse surface of a print medium, then reversing, inverting and conveying the print medium and forming an image on the reverse surface of the print medium.

2. Description of the Related Art

Currently, a print apparatus, such as a printer, is known that has an automatic double-sided printing function whereby an image can be automatically formed on both the obverse surface and the reverse surface of a print medium. In the print apparatus, first, a print medium supplied by a supply unit is conveyed to a location opposite a print head. Then, the print head performs the printing of the print medium that has reached to the location opposite the print head. Thereafter, the print medium is inverted and reversed, and is again conveyed to the location opposite the print head. Following this, the reverse surface of the print medium, which has been conveyed to and positioned opposite the print head, is printed to obtain a double-sided print medium image.

An example print apparatus having an automatic double-sided printing function is disclosed in Japanese Patent Application Laid-open No. 6-183068. FIG. 11 is a diagram showing the thus disclosed print apparatus. During a single-sided printing process performed by a print apparatus 300, a switching guide member 260 is held at a location indicated by solid lines. Therefore, after a print medium 1, supplied from a paper supply stacker 210, has been printed by a print head 250, the print medium 1 is passed on to the switching guide member 260 and is discharged to a discharge stacker 280, as indicated by an arrow b.

During a double-sided printing process performed for print media P, the position of the switching guide member 260 is changed to a location indicated by broken lines. Therefore, after the print medium 1 has been supplied from the paper supply stacker 210 to the print head 250 and one side has been printed, the print medium 1 is conveyed to a reverse unit 350, as indicated by arrows F and G. Thereafter, the print medium 1 is transported from the reverse unit 350 toward a reverse roller 340 in a direction indicated by an arrow H, which is opposite the direction indicated by the arrow G. Then, the print medium 1 is conveyed by the reverse roller 340, a guide plate 360 and a transport roller 310. Upon reaching the transport roller 310, the print medium is fed along a guide 320 by the impelling force exerted by the transport roller 310. Thereafter, the print medium 1, which has been inverted and reversed, is again guided to the print position opposite the print head 250 and the reverse surface is printed. After the printing of the reverse surface has been completed, the switching guide member 260, displaced by being rotated downward, guides and discharges the print medium 1 to the discharge stacker 280.

The print apparatus 300 disclosed in this publication encloses an image by providing margins at the edges of a print medium P and by controlling the widths of right and left print margins.

Owing to recent improvements in printing technology, print apparatuses are now available for which high-quality image forming, equivalent to that of silver halide photography, is available. Among the print apparatuses for which high-quality image forming is enabled, proposed are print apparatuses capable of performing so-called marginless printing (hereinafter also called full printing) whereby, as in silver halide photography, the provision of margins at the edges of a print medium is not required, and an image can be formed across the entire surface.

A print apparatus that performs the above described full printing is disclosed in Japanese Patent Application Laid-open No. 2003-177898 (US-2003-0053096). This print apparatus not only performs printing in an area inside the edges of a print medium, but also ejects extra ink (coloring material) within a range projecting outward several millimeters from the edges of the print medium. With this arrangement, the formation of margins at the edges of the print medium is prevented, and full printing is ensured. Furthermore, during the marginless printing process, ink ejected outside the edges of the print medium lands on, and is absorbed by, an ink absorption member provided for a platen.

Both the print apparatuses described as conventional examples, the one that performs double-sided printing and the one that performs full printing, are well known. However, when a print apparatus having a double-sided printing function, as disclosed in Japanese Patent Application Laid-open No. 6-183068, performs a full printing operation, as disclosed in Japanese Patent Application Laid-open No. 2003-177989 (U.S.-200300053096), the following enumerated problems have been encountered, and under current conditions, print apparatuses having automatic double-sided printing mechanisms that can perform full printing are not yet commercially available.

Specifically, since print media used for a print apparatus are prepared by cutting a paper roll to obtain a predetermined size, slight cutting errors can occur at either the leading edge or the trailing edge and at either the right or left edge of each print medium. Assume that the width (hereinafter referred to as an overrun distance) of a designated area (hereinafter referred to as an overrun area), extending outward from and enclosing a print medium, into which extra ink is to be ejected is based on an ideal print medium for which there are no cutting errors. The probability then exists that a portion wherein no printing is performed, i.e., a margin, will be formed at either the leading edge or the trailing edge, and either at the right edge or the left edge of the print medium.

Therefore, for a conventional print apparatus that performs full printing only on one side of the print medium, a setup for the overrun distances from the edges is performed as shown in FIG. 12A. As for the four edges P1 to P4 of a print medium P, the overrun distances from the edges P2 (second edge) and P4 (fourth edge), whereat, respectively, there are cutting errors B and D, are set so as to be greater than the overrunning distances from the edges P1 (first edge) and P3 (third edge), whereat there are no cutting errors B and D. That is, an overrun distance A is set for the first edge P1, while taking into account the positioning error (the search accuracy) between the location of the leading edge of the print medium in the conveying direction and the print position of the print head. On the other hand, an overrun distance (A+B), obtained by adding the cutting error B to the overrun distance A, is set for the second edge P2.

Furthermore, an overrun distance C is set for the third edge P3, while taking into account an error that occurs due to the obliquely parallel movement of the print medium P. Whereas, an overrun distance (C+D), obtained by adding the cutting error D to the overrun distance C, is set for the fourth end P4. When the overrun distances are designated in this manner for the individual edges of the print medium P, an appropriate image can be printed for which there are no margins at the edges of the print medium.

According to a print apparatus having the automatic double-sided printing mechanism described in Japanese Patent Application Laid-open No. 6-183068, during the double-sided printing process, the obverse surface and the reverse surface of the print medium are reversed, and the leading edge and the trailing edge of the print medium are inverted. That is, in the printing process for the obverse surface, the second edge P2 is located at the rear in the conveying direction (the X direction), while in the printing process for the reverse surface, the second edge P2 is positioned at the front in the conveying direction (the X direction), as shown in FIG. 12B. Then, the overrun distance from the edge P1 of the print medium, is A for the obverse surface printing, and A+B for the reverse surface printing. Further, the overrun distance, from the edge P2 of the print medium, is A+B for the obverse surface printing, and A for the reverse surface printing. Therefore, as indicated by $\alpha$ in FIG. 12, the position of the entire image data relative to the print medium differs as to the obverse surface and the reverse surface.

Therefore, when, for example, an extended image is to be formed across the reverse surface of a print medium and the obverse surface of the following print medium, the continuity of the right segment of the image and the left segment of the image is lost. As a result, the quality of the extended image is deteriorated.

SUMMARY OF THE INVENTION

It is an objective of the present invention is to provide a print method whereby images can be formed by full printing on the obverse and reverse surfaces of a print medium, while avoiding a position shift between the surfaces, and a print apparatus therefor.

To achieve this objective, the present invention has the following configuration.

Specifically, according to a first aspect of the invention, the present invention provides a method for using print means to apply coloring agents to an area of a print medium and to an overrun area, extending outward from and enclosing the print medium, so as to perform printing without margins at the edges of the print medium, comprising:

a setup step of setting a single-sided printing mode, in which an image is printed by using the print means to apply coloring agents to one side of the print medium, or a double-sided printing mode, in which an image is printed by using the print means to apply coloring agents to one side and then to the other side of the print medium;

a generation step of generating image data of a greater size than of the print medium, based on the mode set, information concerning the size of the print medium and information concerning the width of the overrun area; and a color application step of using the print means to apply the coloring agents based on the thus generated image data, wherein, at the generation step, when the single-sided printing mode is set, width of an area that overruns a first edge, which is one end of the print medium in the direction transported differs from width of an area that overruns a second edge, which is the other end of the print medium in the direction transported, and when the double-sided printing mode is set, widths of the areas that overrun the first edge and the second edge match.

According to a second aspect of the invention, the present invention provides a method for printing an image on one side of a print medium, while using print means to apply coloring agents, and reversing the image-bearing print medium and using the print means to print an image on the other side of the print medium, comprising:

a setup step of setting a mode in which the print means is used to apply coloring agents to an area on the print medium and to an overrun area extending outward from and enclosing the print medium, so as to perform printing without margins at the edges of the print medium;

a generation step of, when a mode has been set, based on information concerning the size of the print medium and information concerning the width of the overrun area to generate image data for an area that includes both the area of the print medium and that of the overrun area; and at a color application step, based on the thus generated image data, to apply the coloring agents to the print medium using the print means, whereby, at the color application step, the coloring agents are applied to one side and then to the other side of the print medium, so that, relative to the print medium, the position of image data corresponding to one side of the print medium to which the coloring agents are to be applied matches the position of image data corresponding to the other side.

According to a third aspect of the invention, the present invention provides a method for generating image data to be used in a process wherein coloring agents are applied by recording means to an area on a print medium and an overrun area extending outward from and enclosing the print medium, so as to perform printing without margins at the ends of the print medium, comprising:

a setup step of setting a single-sided printing mode, in which an image is printed by using the print means to apply the coloring agents to one side of the print medium, or a double-sided printing mode, in which images are printed by using the print means to apply the coloring agents to one side of the print means and then to the other side; and a generation step of generating image data for a size greater than that of the print medium, based on the mode that is set, information concerning the size of the print medium and information concerning the width of the overrun area, whereby, at the generation step, when the single-sided printing mode is set, widths of an overrun area at a first end, which is an edge of the print medium in a transportation direction differs from the width of an overrun area at a second end, which is the other edge of the print medium in the transportation direction, and when the double-sided printing mode is set, widths of the overrun area at the first end and of the overrun area at the second end match.

According to a fourth aspect of the invention, the present invention provides a print apparatus for using print means to apply coloring agents to an area on a print medium and to an overrun area, extending outward from and enclosing the print medium, so as to perform printing without margins at the edges of the print medium comprising:

setup means, for setting a single-sided printing mode in which an image is printed by using the print means to apply coloring agents to one side of the print medium, or a double-sided printing mode, in which an image is printed by using the print means to apply coloring agents to one side and then the other side of the print medium;

generation means for generating image data for a size greater than the print medium, based on the mode that is set by the setup unit, information concerning the size of the print medium and information concerning the width of the overrun area; and color application means for applying the coloring agents based on the image data generated by the generation means using the print means;

wherein, when the single-sided printing mode is set, the generation means provides different widths for an overrun area at a first end, which is one edge of the print medium in a transportation direction, and for an overrun area at a second end, which is the other edge of the print medium in the transportation direction, and when the double-sided printing mode is set, providing matching widths for the overrun area at the first end and the overrun area at the second end.

According to a fifth aspect of the invention, the present invention provides a print apparatus for printing an image on one side of a print medium by employing print means to apply a coloring agent, reversing the image-bearing print medium, and using the print means to print an image on the other side of the print medium, comprising:

a generation means, for, when a mode is set in which coloring agents are applied by the print means to an area on the print medium and to an overrun area outside the print medium and printing without margins at the edges of the print medium is performed, based on information concerning a print medium size and information concerning an overrun area width to generate image data for an area that includes the print medium area and the overrun area; and a color application unit for using the print means to apply the coloring agents based on the thus generated image data, wherein the generation means generates image data for one side and the other side of the print medium, so that relative to the print medium, the position of an image data, corresponding to one side of the print medium matches, relative to the print medium, the position of an image data corresponding to the other side.

According to the above described arrangements, even when double-sided marginless printing is performed for a print medium wherefor there are cutting errors at the edges, each side can be fully printed without a margin being formed. Further, to form an extended image across the reverse surface of one sheet and the obverse surface of the following sheet that constitute a double-spread page, vertical position shifting between the right segment and the left segment of the image on the double-spread page can be prevented, and a high-quality extended image having continuity can be provided.

The above and other objects, effects, features and advantages of the present invention will become more apparent during the following description of the embodiments thereof, presented in conjunction with the accompanying drawings.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

The preferred embodiments of the present invention will now be described while referring to the accompanying drawings.

First Embodiment

Figure 1:
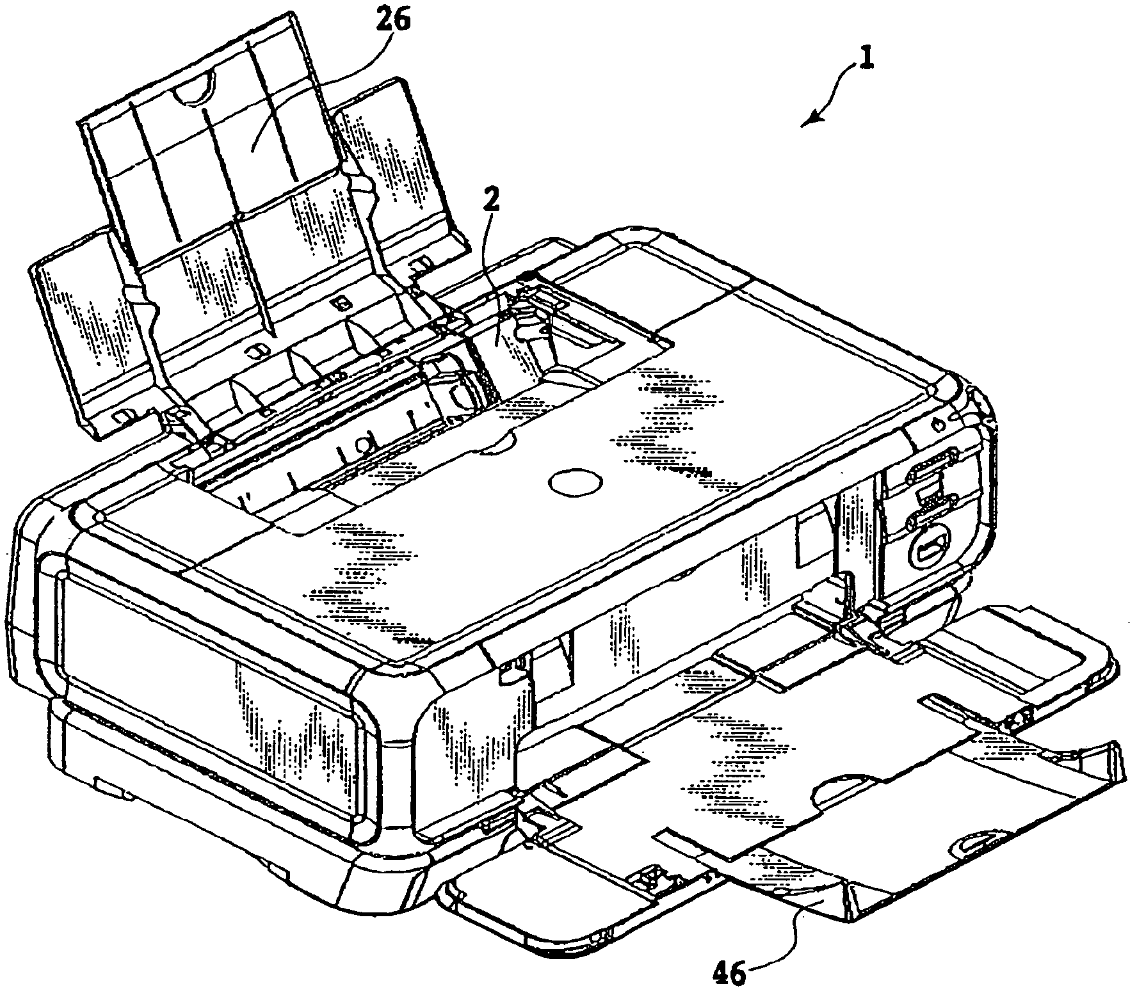
FIG. 1 is a perspective view of a print apparatus according to a first embodiment of the present invention.
Figure 2:
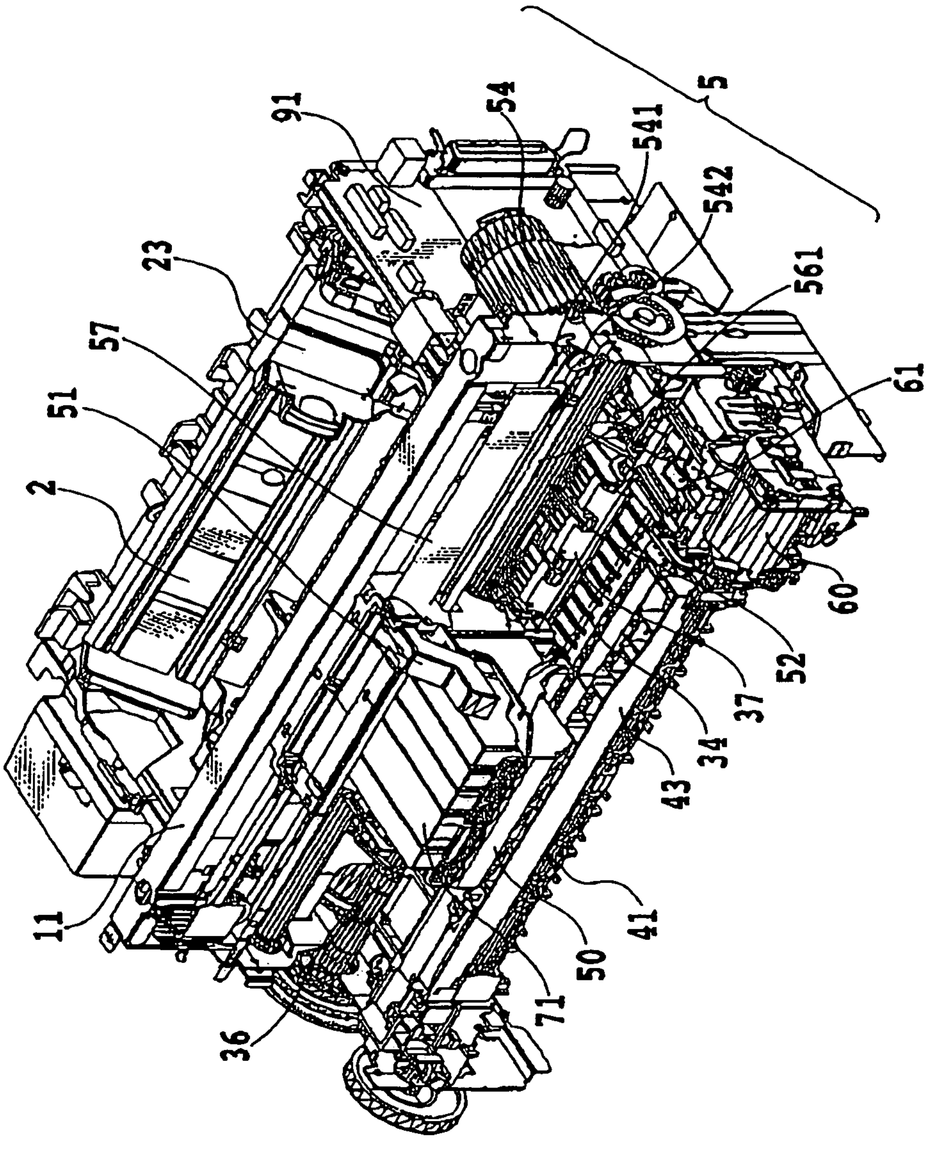
FIG. 2 is a perspective view of the mechanism section of the print apparatus according to the first embodiment of the invention.
Figure 3:
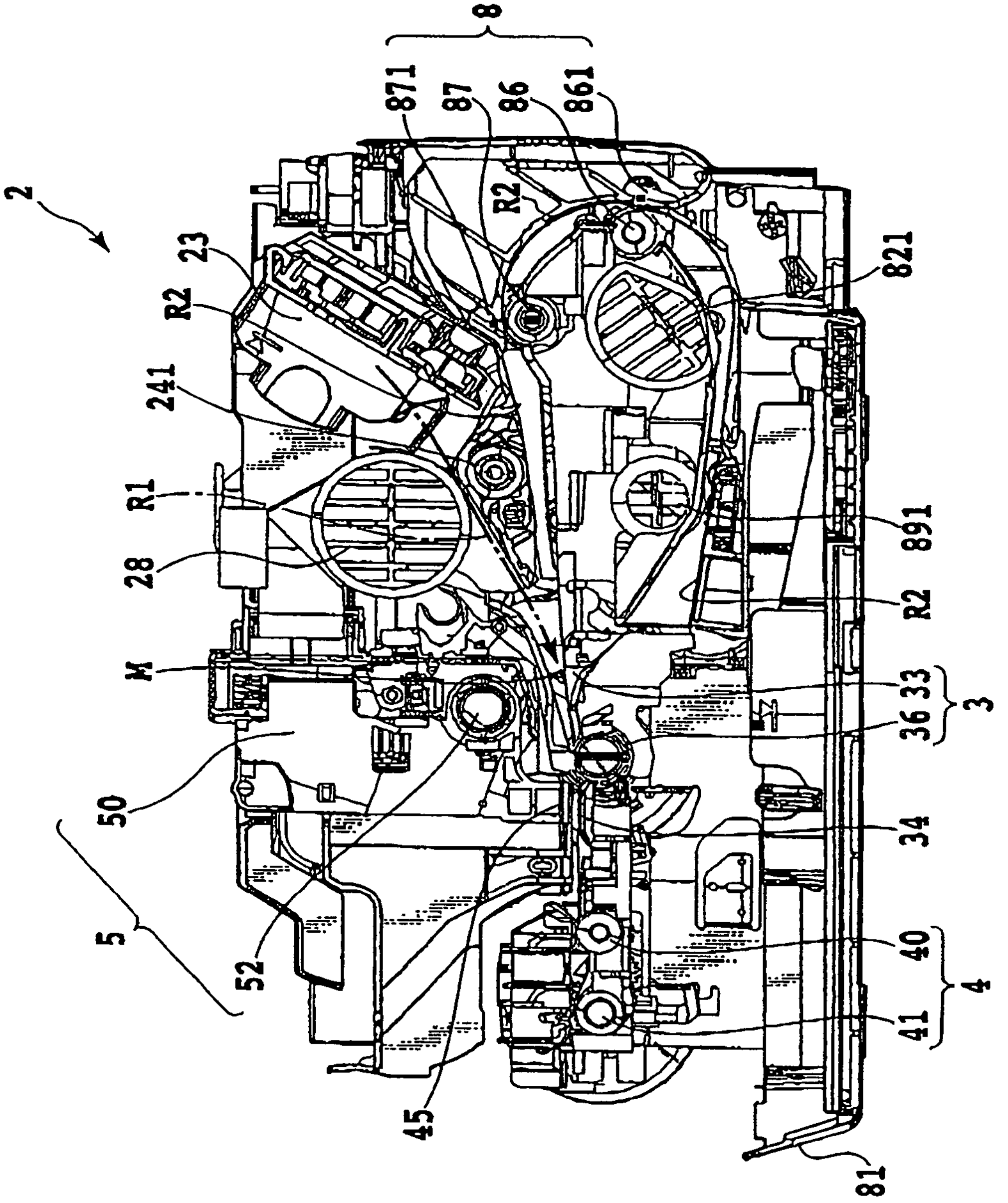
FIG. 3 is a vertical side view of the print apparatus according to the first embodiment of the invention.
Figure 4:
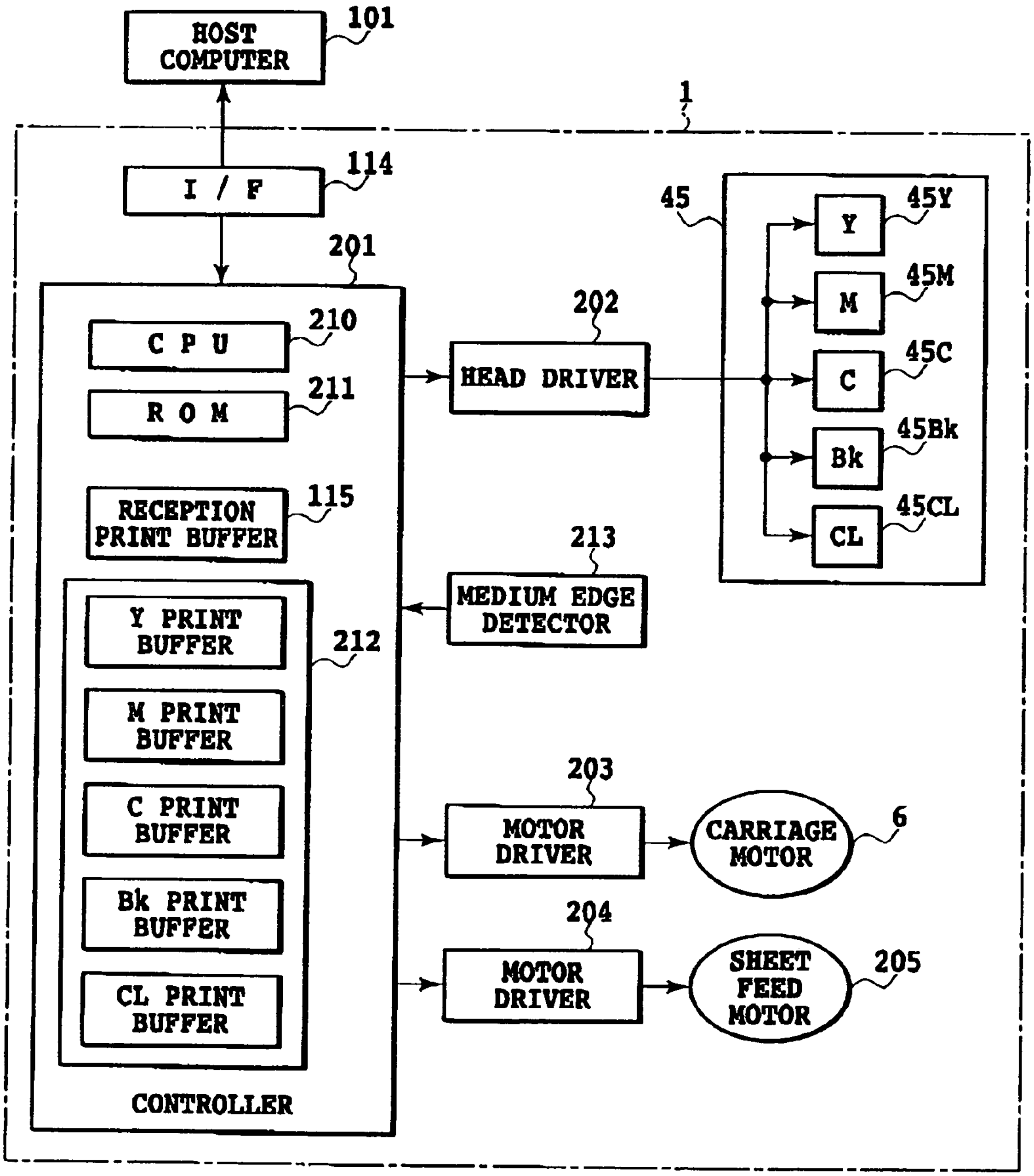
FIG. 4 is a schematic block diagram showing the configuration of a control system according to the first embodiment of the invention.
Figure 5:
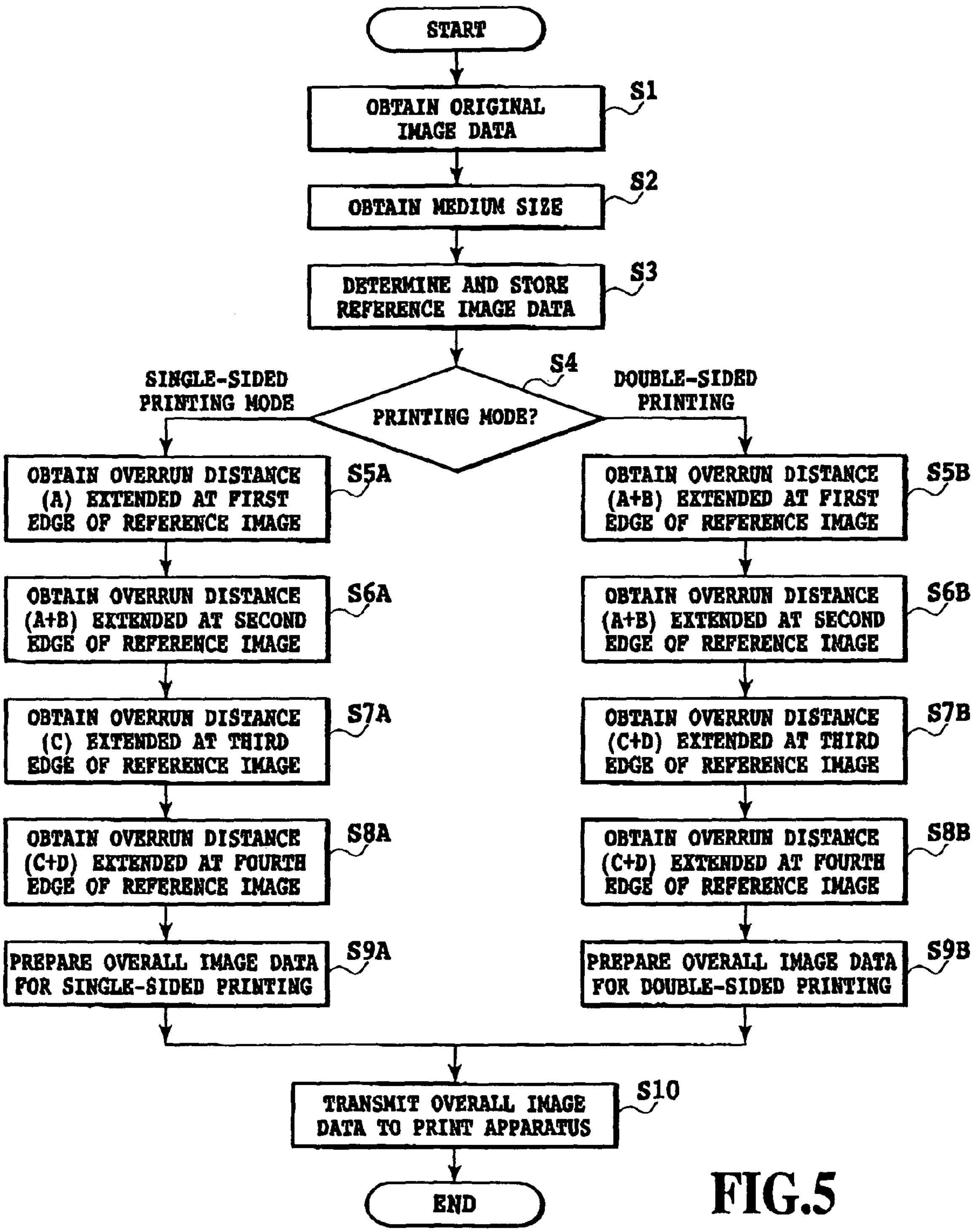
FIG. 5 is a flowchart showing the image data generation processing performed in the first embodiment of the invention.
Figure 6:
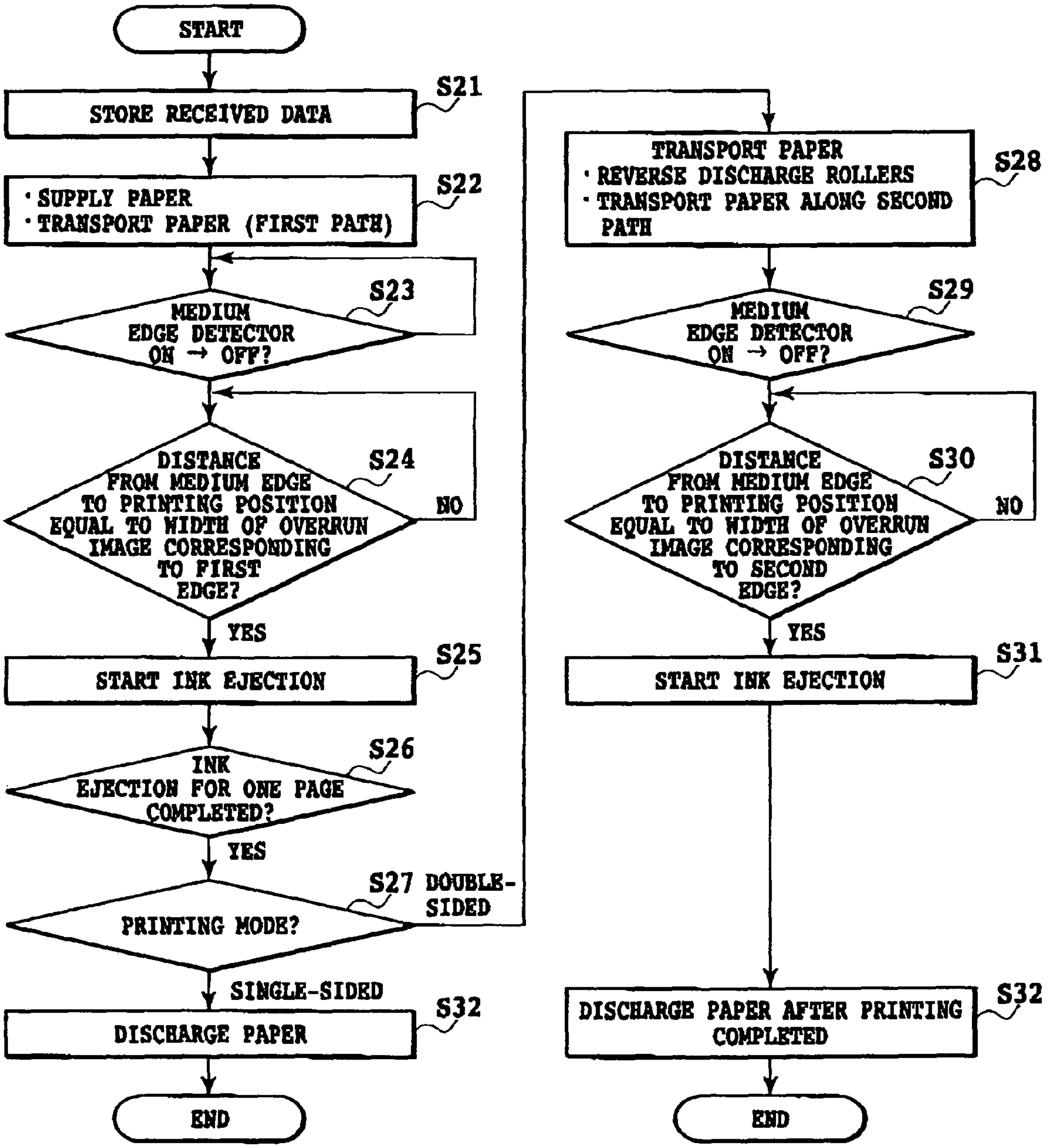
FIG. 6 is a flowchart showing the printing processing performed in the first embodiment of the invention.
Figure 7:
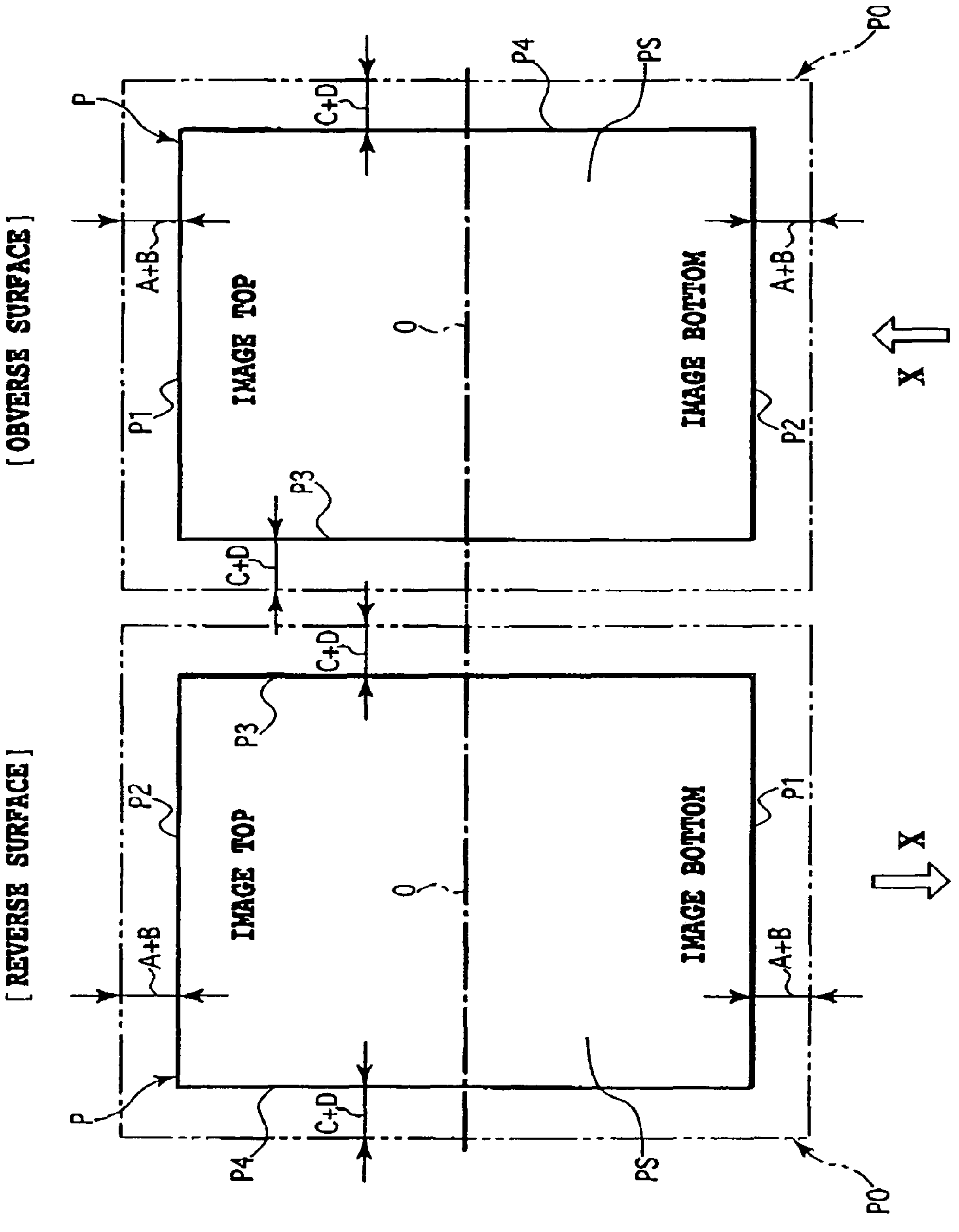
FIG. 7 is an explanatory diagram showing overrun distances for images and images printed on a print medium when, according to the first embodiment of the invention, double-sided printing is to be performed on the obverse surface and the reverse surface of a print medium.

A first embodiment of the present invention will be explained while referring to FIGS. 1 to 7. FIG. 1 is a perspective view of a print apparatus according to the first embodiment of the invention. FIG. 2 is a perspective view of the mechanism section of the print apparatus according to the first embodiment. FIG. 3 is a vertical side view for the first embodiment. FIG. 4 is a schematic block diagram showing the configuration of a control system for the first embodiment. FIG. 5 is a flowchart showing the image data generation processing performed for the first embodiment of the invention. FIG. 6 is a flowchart showing a printing operation performed for the first embodiment. FIG. 7 is an explanatory diagram showing overrun distances for images and actual ink ejection ranges that are designated for full printing (also called marginless printing or borderless printing) according to the present invention.

First, the schematic configuration of the print apparatus applied for the first embodiment will be described while referring to FIGS. 1 to 3.

An ink jet print apparatus 1 comprises: a supply unit 2, a feed unit 3, a carriage 5, a discharge unit 4, a U turn/automatic double-sided transport unit 8 and a paper cassette 81.

The print apparatus 1 can selectively execute a single-sided printing mode for printing data only on the obverse surface of a print medium and a double-sided printing mode for printing data both on the obverse surface and the reverse surface of a print medium.

Assume that print media are mounted on a supply tray 26 of the supply unit 2, the single-sided printing mode is selected and a printing start instruction is entered. A separation roller 241 is rotated, and one print medium P is separated from multiple print media mounted on the supply unit 2. By the force produced by the rotation of a supply roller 28, the single separated print medium P is fed, on a paper guide flapper 33, to a transport roller 36. As the transport roller 36 performs the intermittent transportation, the print medium P is conveyed to a platen 34 located at a printing position. R1, indicated in FIG. 3 by a chain line, represents a path (a first path) from the supply unit 2 to the transport roller 36.

The carriage 50 is supported at the location facing the platen 34, and can reciprocate along a guide shaft 52 arranged in the direction perpendicular to the direction in which the print medium P is transported. Multiple color ink tanks (in FIG. 2, ink tanks for five colors: yellow (Y), cyan (C), magenta (M), black (B) and light cyan (CL)) are detachably mounted on the carriage 50. Four types of print heads (print means) 45, which eject ink supplied from the individual ink tanks, are also detachably mounted on the carriage 50. The print heads 45 are mounted on the carriage 50 at predetermined intervals, so as to be positioned opposite the platen 34.

As the print heads 45 are moved in the main scan direction, with the carriage 50, they eject ink droplets onto the surface of a print medium P that has been transported to the platen 34. The printing operation (the main scanning) performed by the print heads 45 and the transportation of the print medium P by the transport roller 36 are alternately repeated, and an image is gradually formed on one side of the print medium P. For full printing, in which an image is formed across the entire surface of a print medium without any margins being formed at the edges, ink is ejected into an area outside the print medium P in accordance with designated image data that will be described later, and by the ejection control of the print heads. It should be noted that ink ejected outside the print medium is absorbed by an ink absorption member provided for the platen 34. Though the rotation of discharge rollers 40 and 41, the print medium on which an image is formed by the print heads 45 is discharged to a discharge tray 46 located at the front of the print apparatus 1.

When a full printing instruction is entered in the print apparatus 1, the following printing operation is performed. First, as in single-sided printing, by rotating the separation roller 241, the supply roller 28 and the transport roller 36, a print medium P is fed from the supply unit 2 through the paper guide flapper 33 to the platen 34. Then, an image is printed, by the print heads 45, on one side (the obverse surface) of the print medium P. The position of the paper guide flapper 33 can be switched between a state (see FIG. 3) wherein the end near the paper discharge side is low and a state wherein the end is high. The print medium P, for which the printing of the obverse surface has been completed is fed to the discharge tray 46 by the forward rotation of the discharge rollers 40 and 41. In the obverse surface printing operation, the forward edge of the print medium P in the transporting direction is defined as a first edge, and the rear edge in the transporting direction is defined as a second edge.

Thereafter, the position of the paper guide flapper 33 is changed, and the end of the paper guide flapper 33 near the paper discharge side is changed from low, as shown in FIG. 3, to high and thus is maintained. In this situation, the rotation of discharge rollers 40 and 41 is reversed, and the print medium P whereon the image has been printed on the obverse surface is transported to the platen 34 in the reverse direction. At this time, the edges of the print medium P in the transport direction are inverted, i.e., the second edge of the print medium P becomes the leading edge and the first edge becomes the trailing edge. The print medium P, after passing the platen 34, is passed under the paper guide flapper 33 and guided to a second U-shaped path R2 that is located below the first path R1. Two pairs of rollers, i.e., a pair consisting of a U turn pinch roller 861 and an intermediate roller 86, and a pair consisting of a U turn pinch roller 871 and an intermediate roller 87, are located upstream and downstream along the second path R2. After the print medium P has been guided to the second path R2, the print medium P is fed by these roller pairs to a point M, where the first path R1 and the second path P2 merge, while the reverse surface of the print medium P is positioned facing upward. At this time, the discharge side end of the paper guide flapper 33 has already been changed to its low position. Therefore, the print medium P that has reached the merge point M is passed by the paper guide flapper 33 and again transported to the print heads 45, and an image is printed on its reverse surface. When the reverse surface printing is full printing, in which an image is formed across the entire surface of a print medium, ink is ejected into the area outside the print medium P. Thereafter, the print medium P whereon images have been printed both on the obverse and the reverse surfaces is discharged to the discharge tray 46 by the discharge rollers 40 and 41.

As described above, when the print medium P is supplied from the supply tray 26, or from the paper cassette 81, or when, for double-sided printing, the print medium P is transported so that an image can be printed on its reverse surface (along the same transport path as used for the print medium P fed by the paper cassette 81), the discharge side end of the paper guide flapper 33 is maintained at the low position. Thus, the print medium P passes over the paper guide flapper 33. Whereas when, for double-sided printing, the print medium P carried to the discharge tray 46 is reversely fed along the transport path, the discharge side end of the paper guide flapper 33 is maintained at the high position. Thus, the print medium P passes under the paper guide flapper 33. Since the position of the paper flapper 33 is controlled in this manner, the print medium P can be transported along different transport paths for double-sided printing and for paper supply operations that use the supply tray or the paper cassette.

The paper cassette 81 is provided at the lower portion of the print apparatus 1 for this embodiment, so that single-sided printing and double-sided printing can be performed for print media mounted in this paper cassette 81. That is, a print medium in the paper cassette 81 is fed by a supply roller 821 to the transport path R2, and is transported to the print heads 45 through the rotation of the individual rollers along the transport path R2. In this manner, the printing operation can be performed. Further, for double-sided printing, the print medium, on which an image has been printed on one side, is conveyed in the reverse direction by the discharge rollers 40 and 41, and again passes along the transport path R2. In this manner, the print medium is reversed and inverted, and is transported to the print heads 45. As a result, printing can be performed on both the obverse surface and the reverse surface of the print medium.

The schematic arrangement of a control system for this embodiment will now be described while referring to FIG. 4.

FIG. 4 is a block diagram showing the configuration of the ink jet print apparatus 1 according to the first embodiment of the present invention. A host computer 101 is connected to the print apparatus 1 through an interface 114. A printer driver, which generates the image data and control data that permits the print apparatus 1 to perform printing, is transmitted from a predetermined storage medium and stored in the host computer 101. The image data generation means function is provided by the printer driver and the hardware resources of the host computer 101.

A controller 201 serves as control means for controlling the entire operation of the print apparatus 1. The controller 201 includes; a CPU 210, such as a microprocessor; a ROM 211, in which a control program executed by the CPU 210 and various other programs are stored; and a RAM 212. The RAM 212 is used as a work area by the CPU 210 when executing various processes, and various data are temporarily stored therein. Further, Y, M, C, Bk and CL print buffers (image data storage means) for storing print data are provided in the RAM 212 in consonance with a reception print buffer 115 and the print heads 45Y, 45M, 45C, 45Bk and 45CL that print ink colors Y. M, C, Bk and CL.

A head driver 202 drives the yellow print head 47Y, the magenta print head 47M, the cyan print head 45C, the black print head 45Bk and the light cyan print head 45CL in accordance with color print data output by the controller 201. Motor drivers 203 and 204 respectively drive a carriage motor 6 and a sheet feed motor 205.

A medium edge detector 213 is a sensor located at a predetermined reference position along the transport path that extends from the point in the ink jet print apparatus 1 whereat the first and second paths merge to the print heads 45. The output of the medium edge detector 213 is changed from ON to OFF when the leading edge of the print medium, conveyed along either the first path R1 or the second path R2, reaches the reference position. Based on the output of the medium edge detector 213, the CPU 210 determines whether the edge of the print medium has reached the reference position. An optical sensor, a mechanical sensor employing a lever, or an optical sensor that also employs a lever can be used as the medium edge detector 213.

An explanation will now be given for an example of the image data generation processing and the printing operation performed when full printing (so-called marginless printing in which printing is performed without margins being formed at the edges of a print medium) is automatically provided for a print medium.

First, the image data generation processing performed by the host computer 101 will be described while referring to FIG. 5. Upon receiving a printing instruction from a user, the host computer 101 obtains image data (original image data) generated by a digital pickup apparatus, and stores the original image data in a predetermined storage area in the memory of the host computer 101 (step S1). Then, the host computer 101 obtains information concerning the size of a print medium designated, using the printer driver, by the user (step S2), and based on the size information for the print medium, converts the original image data into image data (reference image data PS) that conform to the size. Subsequently, the host computer 101 stores the reference image data PS in a predetermined storage area in the host computer 101 (step S3). During the process for designating the size of a print medium using the printer driver, the user designates an ideal size, such as A4 or B5, for a print medium for which there are no cutting errors.

Figures 12A, 12B:
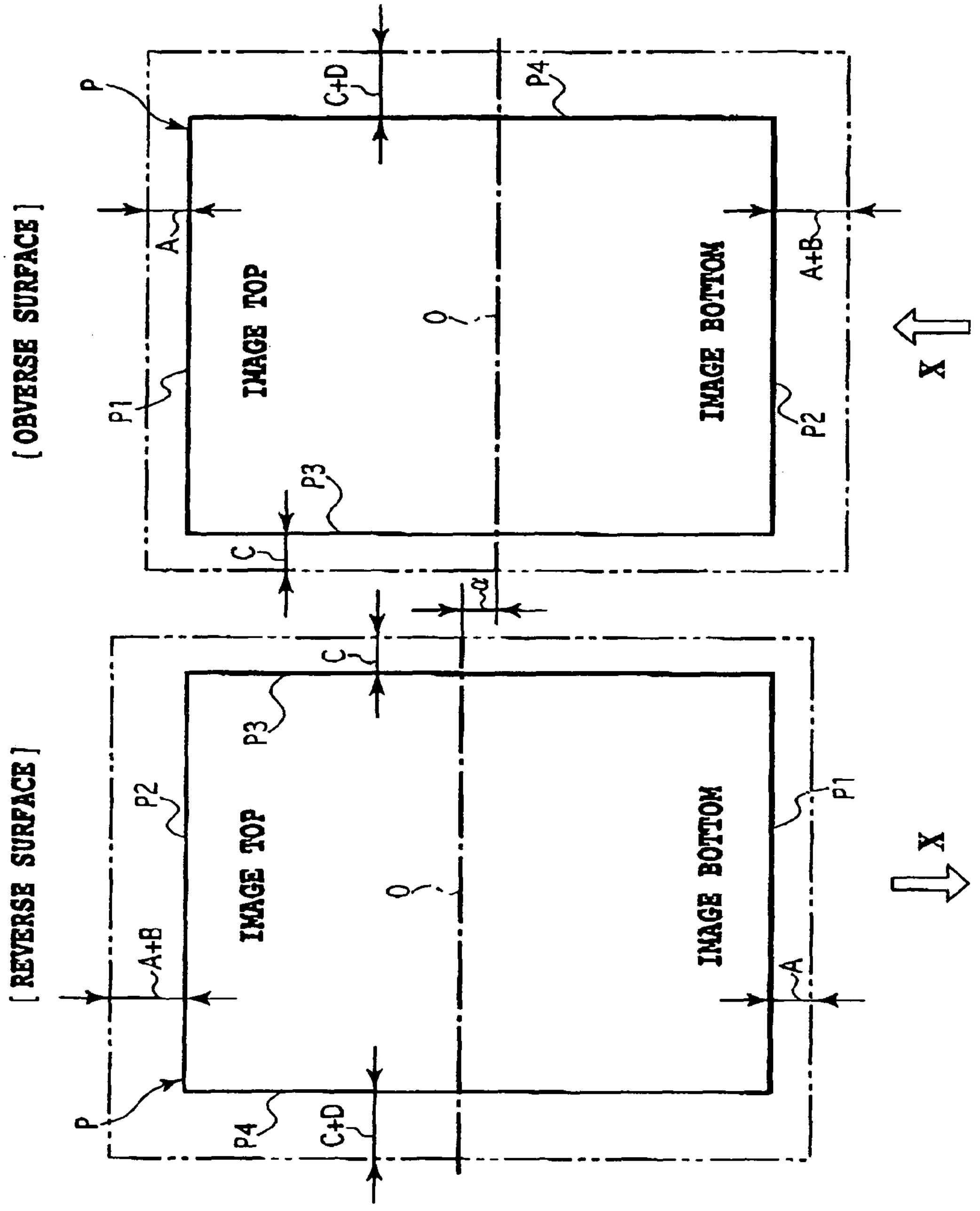
FIGS. 12A and 12B is an explanatory diagram showing an overrun distance setup method employed by a conventional single-sided printing apparatus that performs full printing of a print medium, and the positions of images that are printed on the obverse and the reverse surfaces of a print medium by a conventional double-sided printing apparatus that uses the overrun distance setup method.

When the reference image data have been acquired, the host computer 101 performs the following operation. First, the host computer 101 determines whether the user has designated single-sided printing, for printing only one side of a print medium, or double-sided printing, for printing both the obverse surface and the reverse surface of a print medium (step S4). Then, in accordance with the designated mode, as shown in FIG. 12 or 7, the host computer 101 creates the overall image data, while taking into account overrun distances (the widths of areas that overrun the print medium) designated by the user while using the printer driver, or overrun distances designated as default values, and the reference image data. Then, the host computer 101 stores the obtained overall image data in the predetermined storage area in the host computer 101 (steps S5A to S9A, or steps S5B to S9B). Thereafter, the host computer 101 transmits, to the print apparatus 1, the overall image data created at step S9A or step S9B (step S10). The overall image data are data corresponding to areas indicated by double-dashed chain lines on the surfaces shown in FIGS. 7 and 12, and cover a size greater than that of the print medium.

The operation performed at steps S5A to S9A in FIG. 5 will now be explained in detail. The factors for determining the overrun distances for an image in the forward and rearward direction of the print medium can be a positioning error (searching error) A between the position of the leading edge of the print medium near the upstream in the transportation direction and the print position of the print head, and a print medium cutting error B. Therefore, in this embodiment also, when full printing is to be performed for only one side, the overrun distances are designated as indicated for the obverse surface shown in FIG. 12;

$$\text{overrun distance(first edge)}=A$$

$$\text{overrun distance(second edge)}=A+B$$

That is, the overrun distance A from the first edge P1 of the print medium, where the cutting error B does not occur, is obtained (step S5A), and the overrun distance (A+B) from the second edge P2, where the cutting error B may occur, is obtained (step S6A).

Further, the factors for determining the overrun distances in the right and left directions of the print medium can be a skew error C that occurs during transportation and a cutting error D for a print medium. Therefore, in this embodiment also, when full printing is to be performed for only one side, the overrun distances are designated as follows;

$$\text{overrun distance(third edge)}=C$$

$$\text{overrun distance(fourth edge)}=C+D$$

That is, the overrun distance C from the third edge P3, where the cutting error D does not occur is obtained (step S7A), and the overrun distance (C+D) from the fourth edge P4, where the cutting error D may occur, is obtained (step S8A).

Next, overall image data indicated by the double-dashed chain line on the obverse surface in FIG. 12 are created based on the overrun distances obtained at steps S5A to S8A, the print medium size information obtained at step S2 and the reference image data PS prepared at step S3.

When the double-sided printing mode is designated, the searching error A and the cutting error B must also be considered in order to perform appropriate full printing in the directions of the leading and the trailing edges of the print medium P. However, since the edges of the print medium P in the transportation direction are inverted (the front and rear ends of the image are changed) between the obverse surface printing and reverse surface printing, the upper and lower portions of image data must be exchanged to start printing. Therefore, when image data for single-sided printing designated in the above described manner are employed for both obverse surface printing and reverse surface printing, the center positions of images printed on the obverse surface and on the reverse surface are vertically shifted, relative to each other, which has been already described in the related art (see FIG. 12).

In this embodiment, therefore, when full printing is to be performed for both sides of the print medium, overrun distances are designated as shown in FIG. 7;

overrun distance(first edge)=$A+B$ overrun distance(second edge)=$A+B$

That is, for the second edge P2 where the cutting error B may occur, the overrun distance (A+B) is obtained as in the single-sided printing mode (step S5B), and is also obtained for the first edge P1 where the cutting error B does not occur, the overrun distance (A+B) is obtained (step S6B).

Further, for the left and right directions of the print medium P, the skew error C that occurs during transportation and the cutting error D for the print medium P are considered, as in the single-sided printing. Thus, for the print medium P, the left and right overrun distances are designated as shown in FIG. 7;

overrun distance(third edge)=$C+D$ overrun distance(fourth edge)=$C+D$

That is, the overrun distance (C+D) from the third edge P3 of the print medium P where the cutting error D does not occur is obtained (step S7B), and the overrun distance (C+D) from the fourth edge P4 of the print medium P where the cutting error D may occur is obtained (step S8B).

At step S9B, the overall image data indicated by the double-dashed chain line in FIG. 7 are created based on the overrun distances obtained at steps S5B to S8B, the print medium size information obtained at step S2 and the reference image data PS prepared at step S3. Specifically, the overall image data are prepared so that the vertical length of the image is equal to the size obtained by adding the size of the print medium to the overrun distance (A+B) at the first edge and the overrun distance (A+B) at the second edge. Such data can be obtained by vertically expanding the reference image data PS. The reference image data PS are also expanded horizontally, so that the horizontal size of an image provided by the overall image data is equal to the size obtained by adding the size of the print medium P to the overrun distance (C+D) at the third edge and the overrun distance (C+D) at the fourth edge. As a result, the data obtained by expanding the reference image data are used as the overall image data.

When the overrun distances at the leading and trailing edges (the edges P1 and P2 in FIG. 7) of the print medium P are uniform, the position of the overall image data to be printed on the obverse surface of the print medium P can match the position of the overall image data to be printed on the reverse surface of the print medium P. According to this arrangement, when an extended image is to be formed across two sheets of print media, images on the individual pages can be aligned in the vertical direction (X direction). Furthermore, when the left and right overrun distances of the print medium P are also uniform, margins having the same widths can be provided at the left and right edges (the edge P3 of the reverse surf ace and the edge P3 of the obverse surface in FIG. 7) of the print medium P. The overall image data, which have been prepared based on the reference image data and the overrun distances, are converted into data having a form appropriate for the printing operation performed by the print apparatus 1, and are transmitted to the print apparatus 1 (step S10).

The printing operation performed for the first embodiment will now be explained while referring to the flowchart in FIG. 6.

At step S21, image data (overall image data prepared based on the reference image data and the overrun distances) generated by the host computer 101, a printing start instruction and various received data, such as single-sided/double-sided printing mode setup data, are stored in the reception print buffer 115 and the other predetermined storage area. The image data stored in the reception print buffer 115 are divided into image data corresponding to individual colors, and the divided image data are stored in corresponding print buffers 212. Then, in accordance with the received printing start instruction, the supply process for a print media P to be mounted on the supply unit 2 is started, and a print medium P is supplied and conveyed along the first path R1 (step S22). When the leading edge of the print medium P is detected by the medium edge detector 213 (step S23), the CPU 210 calculates the distance from the leading edge of the print medium P to the printing start position, and determines whether the print medium P has been transported that distance. i.e., whether the print medium P has reached the location whereat the foremost end of the overall image data should be printed. The above described distance matches the distance between the position along the transport path corresponding to the foremost end of the overall image data and the position of the medium edge detector 213, and the calculation of the distance is performed based on data transmitted by the host computer 101.

When the distance traveled by the print medium P has equalled the calculated distance (step S24), the CPU 210 reads image data from the print buffer 212, and based on the image data, initiates the ejection of ink by the print heads 45 (step S25). At this time, first, ink is ejected into an overrun area outside the first edge of the print medium P. Then, when the first edge P1, the leading edge, of the print medium P reaches the print position, ink land on the print medium P, gradually forming an image thereon.

Thereafter, when it is determined that the ink ejection for the overall image data for one page has been completed (step S26), mode setup data received in advance from the host computer 101 are examined to determine whether the currently designated printing mode is the single-sided printing mode or the double-sided printing mode (step S27). When the single-sided printing mode has been selected, the discharge rollers 40 and 41 are rotated in the same direction as in the printing operation, and the image bearing print medium P is discharged to the discharge tray 46. As a result, the printing for a single sheet is completed.

When it is determined at step S26 that double-sided printing has been designated, the rotation of the discharge rollers 40 and 41 is reversed to transport the print medium P to the second path R2. Then, the individual above described rollers arranged along the second path R2 are rotated and transport the print medium P (step S28). During the course of this transportation, the print medium P is reversed and inverted. And when the second edge P2, the leading edge in the transportation direction, of the thus inverted print medium P is detected by the medium edge detector 213 (step S30), the CPU 210 again calculates the distance from the second edge of the print medium P to the printing start position. Then, when the print medium P has been conveyed the calculated distance, i.e., when the print medium P reaches the position whereat the foremost end of the overall image data should be printed, the ink ejection operation is begun (step S31). Thereafter, when the ejection of ink for the overall image data for one page has been accomplished, the double-sided printing for the print medium P is completed, and the print medium P is discharged to the discharge tray 46 by the rotation of the discharge rollers 40 and 41 (step S32).

As is described above, according to the first embodiment, the overrun distances at the leading edge and the trailing edge (the edges P1 and P2 in FIG. 7) of a print medium P are uniform, and the overrun distances at the left and right edges (edges P3 and P4) of the print medium P are uniform. As a result, the position, relative to the print medium, of the overall image data for the obverse surface and the position, relative to the print medium, of the overall image data for the reverse surface can be matched both in the front and rear directions and to the left and to the right. Furthermore, according to this arrangement, for an extended image formed on a double-spread page, the center position O of the image segment formed on the reverse surface of a print medium can be aligned with the center position O of the image segment on the obverse surface of the other print medium.

Second Embodiment

A second embodiment of the present invention will now be described. For the second embodiment, as for the first embodiment, the configuration shown in FIGS. 1 to 4 is employed. Thus, a detailed explanation will not be given for common configuration features.

In the first embodiment, the overall image data and the ink ejection area are matched, i.e., the overrun area of the image data matches the overrun area into which ink is actually ejected. In this embodiment, the overrun area into which ink is actually ejected is smaller than the overrun area provided by the image data, with the aim of reducing the production of ink mist.

Figure 8:
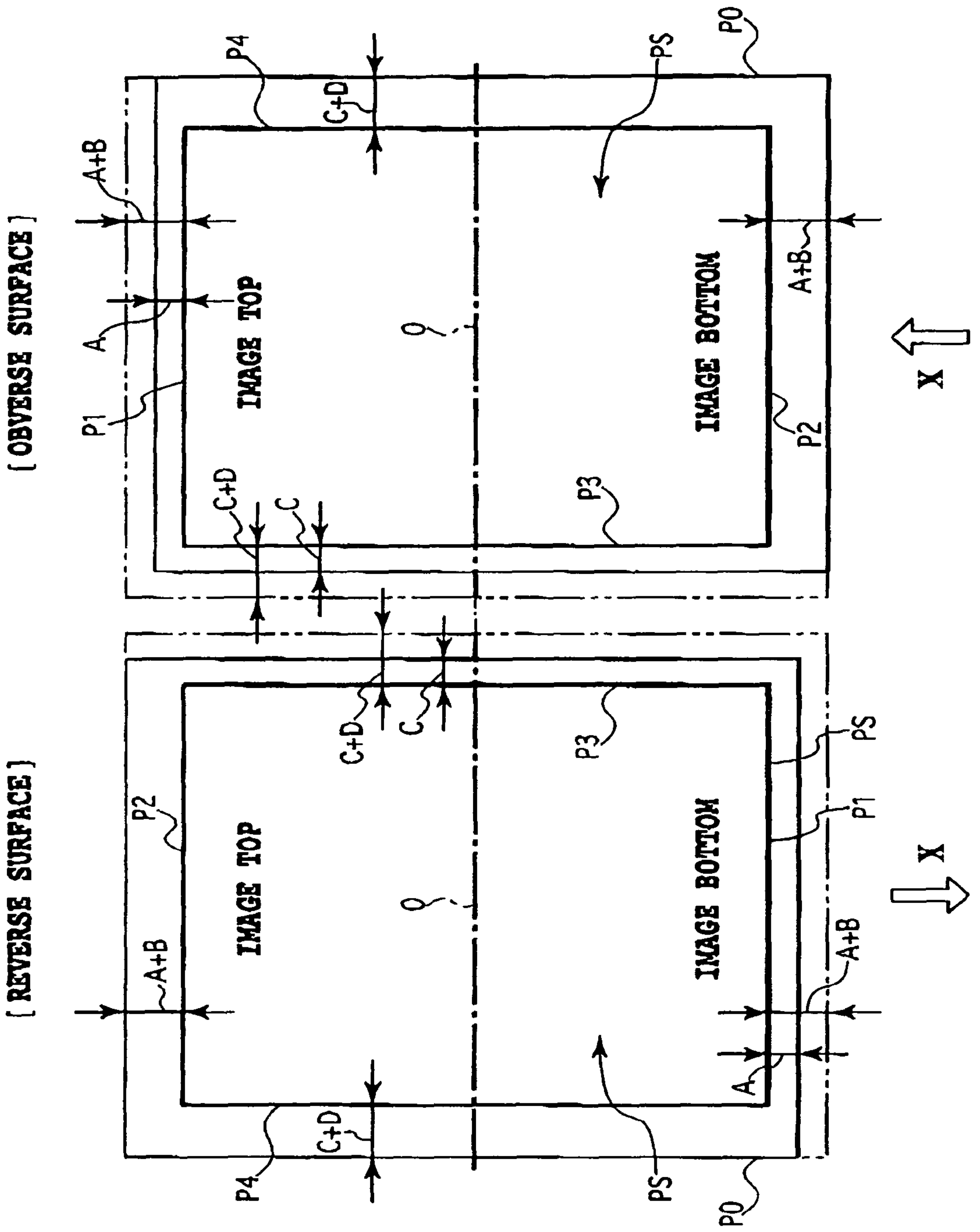
FIG. 8 is an explanatory diagram showing overrun distances for images and images printed on a print medium when, according to a second embodiment of the present invention, double-sided printing is to be performed on the obverse surface and the reverse surface of a print medium.

According to this embodiment, first, as in the first embodiment, reference image data PS that conforms to the size of a print medium P is designated, and image data overrun distances are obtained in consonance with the first edge to the fourth edge of the print medium P. The obtained overrun distances are the same as those in the first embodiment;

image data overrun distance(first edge)=$A+B$ image data overrun distance(second edge)=$A+B$ image data overrun distance(third edge)=$C+D$ image data overrun distance(fourth edge)=$C+D$ Next, the overall image data are created based on the reference image data PS and the image data overrun distances (in FIG. 8, the overall image data consonant with the edges P1 and P3 of the print medium are indicated by double-dashed chain lines, and the overall image data consonant with the edges P2 and P4 are indicated by thin solid lines). The processing performed until the overall image data are obtained is performed in the same manner as in the first embodiment. Therefore, as in the first embodiment, the vertical shifting of the positions of images on a double-spread page consisting of the reverse surface of one print medium and the obverse surface of the other print medium can be suppressed (see FIG. 8). When the overall image data have been prepared in the above described manner, the characteristic process for the second embodiment is initiated. In the second embodiment, the amount of ink ejected into the overrun area for the print medium P is less than that ejected in the first embodiment, so that the amount of ink ejected into the ink absorption member provided for the platen is reduced and the ink mist occurring during the ink ejection is reduced even more.

The mask process is performed for part of the thus prepared overall image data that correspond to the overrun area, so that the actual ejected ink overrun area becomes smaller than the image data overrun area. Specifically, instead of ejecting ink for all the overall image data indicated by the double-dashed chain lines in FIG. 8, a part of the data corresponding to the overrun areas is masked so as to obtain, as ink ejection areas, the areas indicated by the thin solid lines in FIG. 8.

To perform this control process, for the first edge P1 and the third edge P3 of the print medium P that are not affected by the paper cutting accuracy, the overrun distances at which ink is actually ejected are set so they are smaller than the image data overrun distances. As for the second edge P2 and the fourth edge P4 of the print medium that are affected by the paper cutting accuracy, the mask process of image data is not performed, and the overrun distances at which ink is actually ejected match the image data overrun distances, which are maintained.

overrun distance(first edge)=$A$ overrun distance(second edge)=$A+B$ overrun distance(third edge)=$C$ overrun distance(fourth edge)=$C+D$ As described above, since the amount of ink that is ejected and overruns the print medium is reduced, the amount of ink that is discharged onto the ink absorption member is reduced and the production of ink mist during ink ejection is suppressed.

The image data generation processing and printing operation performed in the single-side printing mode are performed in the same manner as in the first embodiment.

As described above, in this embodiment also, the position, relative to the print medium, of the overall image data for the obverse surface and the position of the overall image data for the reverse surface can be matched, both in the front and rear directions and to the left and to the right. Further, vertical shifting of the positions of images on a double-spread page that consists of the reverse surface of one print medium and on the obverse surface of the other print medium can be suppressed. Furthermore, in the second embodiment, during double-sided printing, the amount of ink that is ejected onto areas outside the print medium can be minimized. Therefore, the amount of ink mist that occurs in the print apparatus 1 can be reduced, as can contamination due to ink inside the print apparatus 1. In addition, since the consumption of ink that does not contribute to image printing is reduced, the running costs can also be decreased.

In single-sided printing, as in double-sided printing, a printing method may also be employed whereby, for all the edges of the print medium, the overall image data are generated while taking into account the search error A or the skew error C and the cutting errors B and C, and to perform printing, the amount of ink to be ejected onto areas outside the print medium is suppressed by using a mask.

Third Embodiment

Figure 9:
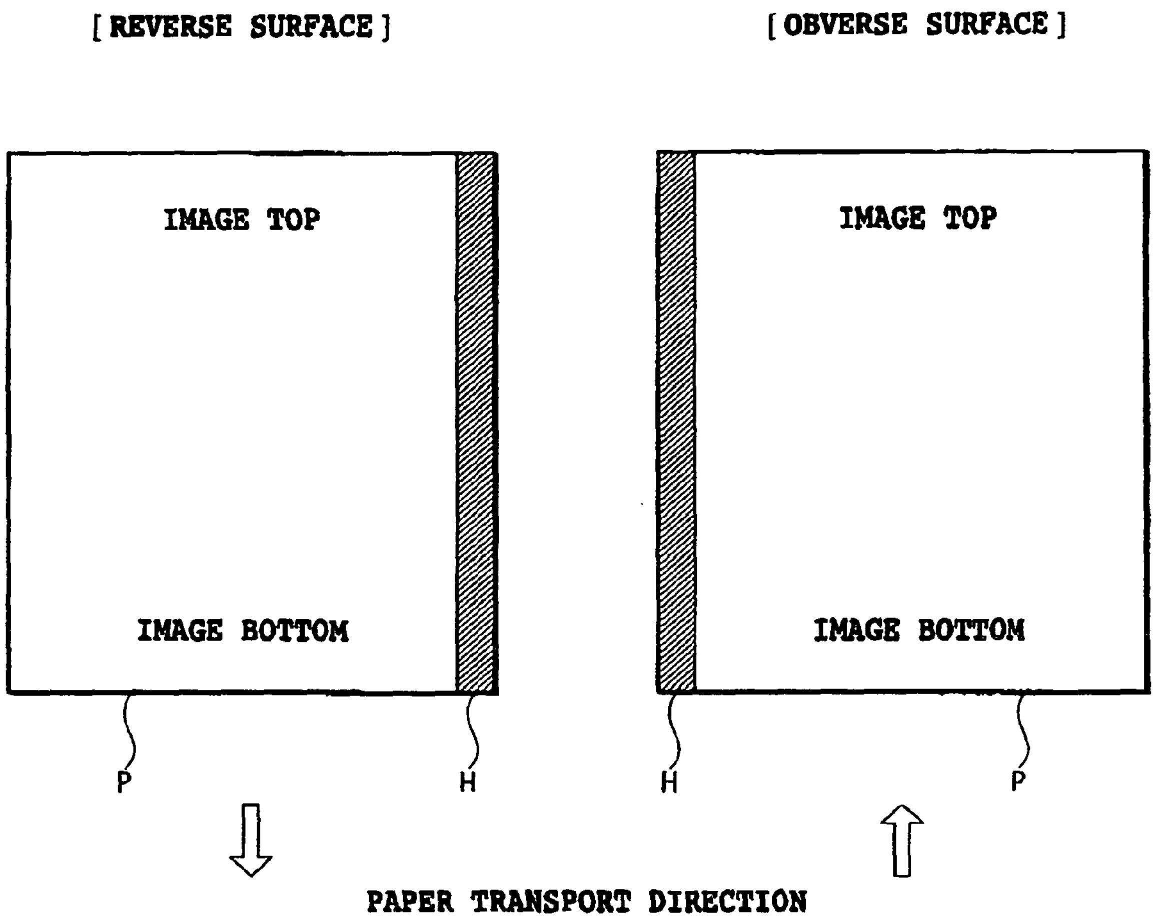
FIG. 9 is a diagram showing binding margins formed on two sheets of print media.

According to a third embodiment, when one set of contiguous original image data is employed to generate an extended image to be printed on two print media, the joints of the images to be printed on a double-spread process page are processed to maintain image continuity. That is, when one contiguous spread image is simply divided into two reference images, and image data are prepared for two print media, the designated image segment would be missed, as an overrun image. Further, as shown in FIG. 9, when a binding margin H is to be obtained at each print medium P, an image printed in the binding margin H may be hidden. Therefore, in the third embodiment, to obtain two reference image data sets from one contiguous image data set, the center portion of an image is allocated and overlapped to the edges of the left and right pages.

Figure 10:
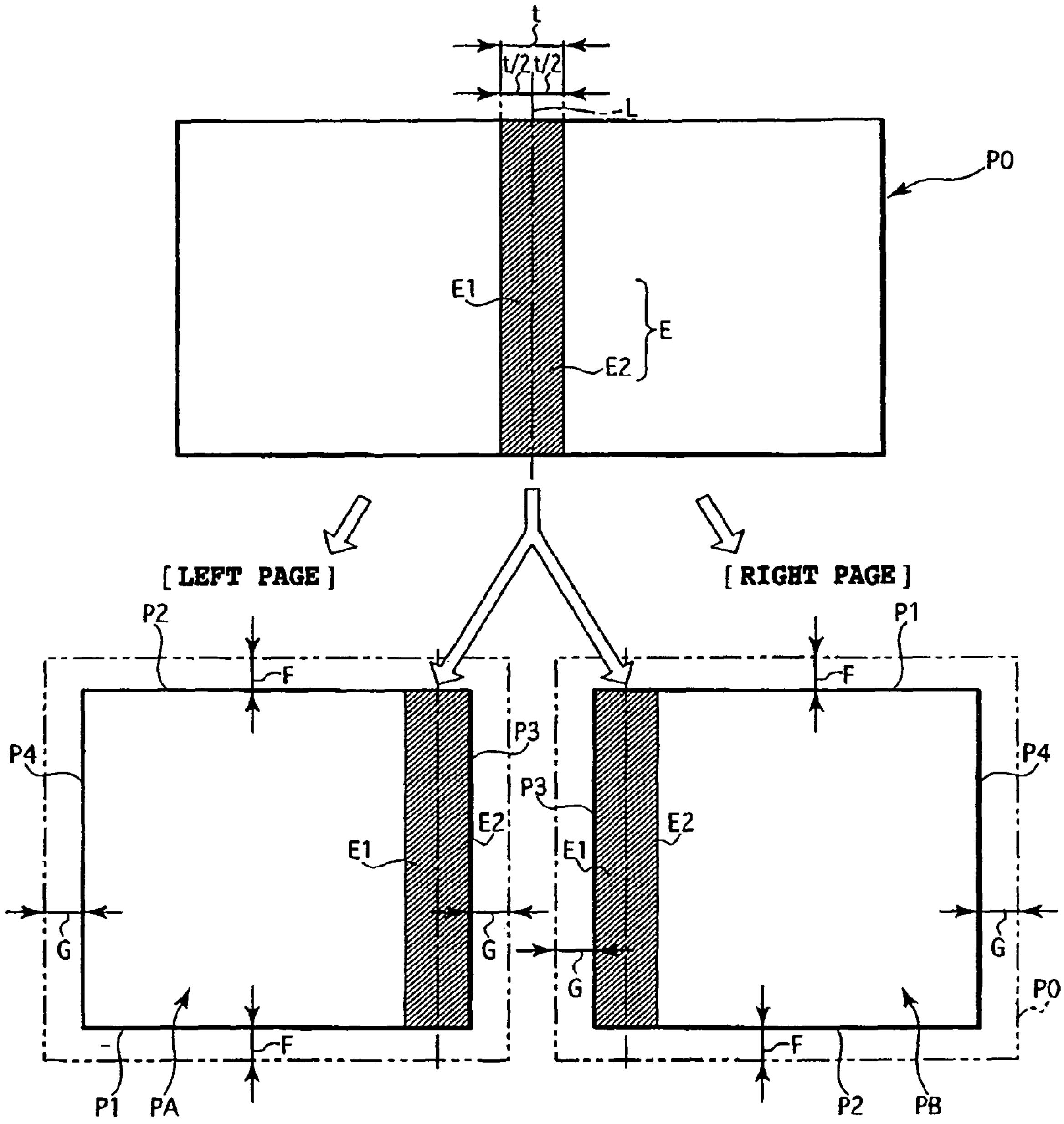
FIG. 10 is an explanatory diagram showing overrun distances for images and binding margins that are printed on a print medium when, according to a third embodiment of the present invention, full printing is to be performed on both sides of a print media.
Figure 11:
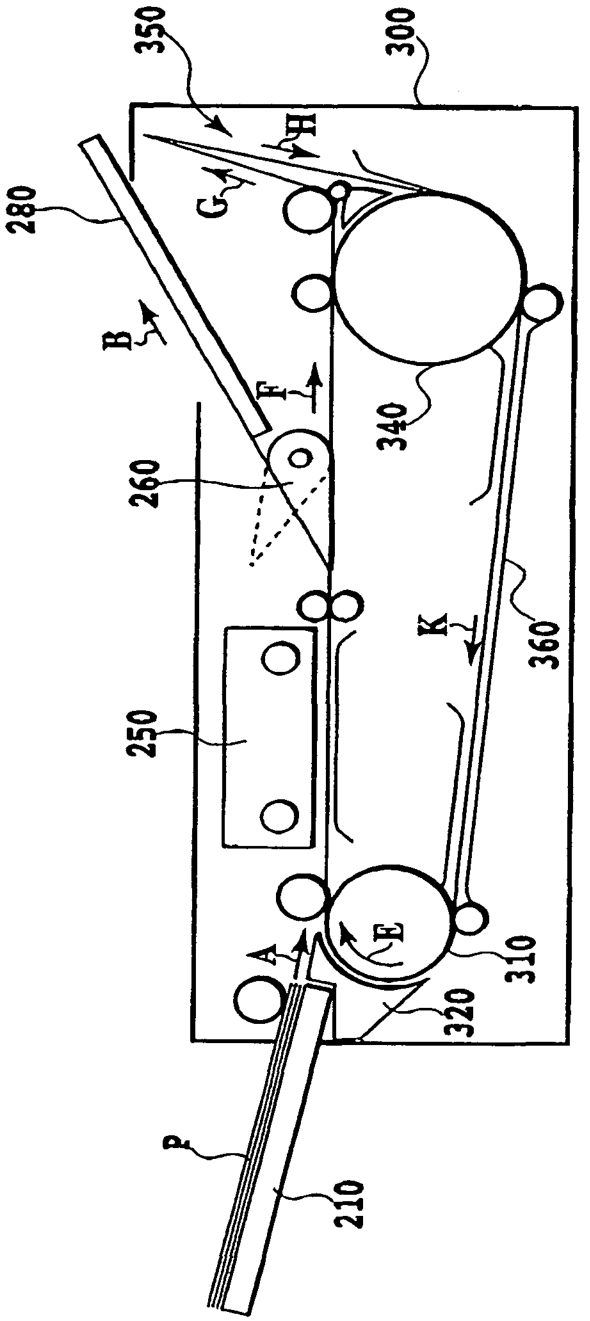
FIG. 11 is a vertical side view of a conventional print apparatus for which the double-sided printing of a print medium is enabled.

This allocation state is shown in FIG. 10. As shown in FIG. 10, when one image P0 is divided for left and right pages, an image portion E having a predetermined width t at its center is added to the edges of the left and right pages, and reference images PA and PB are formed. In the third embodiment, an overrun image F having an identical width is additionally provided for the first edges P1 and the second edges P2 of the reference images PA and PB. Further, an overrun image G having an identical width is additionally provided for the third edges P3 and the fourth edges P4 of the reference images PA and PB. In FIG. 10, images E1 and E2 are those obtained by equally dividing the image E along a center line L.

When the binding margin H for coupling the left and right pages is to be obtained for each page, the area wherein the image E2 of the image E is formed at the right edge on the left page PA is defined as a binding margin H. Further, the area wherein the image E1 of the image E is formed at the left edge of the right page PB is also defined as a binding margin H. As a result, when the left and right pages are bonded along the two binding margins, the images on both the pages are continued, because of the image segment E1 on the left page and the image segment E2 on the right page.

The image data are prepared in the above described manner, and full printing is performed for the obverse surface and the reverse surface of two print media in the same manner as described in the first embodiment. Then, a single image can be formed on a double-spread page, without the center portion of the image either being missed or hidden. Further, also in the third embodiment, since the same overrun distance F is added to the first edges P1 and the second edges P2 of the reference images PA and PB, the positions of the images are not vertically shifted. Therefore, according to the third embodiment, satisfactory continuity can be provided for an image formed on bound, double-spread pages.

In this embodiment, an explanation has been given for an example wherein binding margins are formed. However, when a double-spread page is formed without binding margins, the image E2 on the left page PB and the image E1 on the right page PB can be deleted from the individual reference images.

In the above explanation, an explanation has been given for an example wherein the host computer 101 generates image data and prepares data related to the printing operation. However, instead of the host computer, a program stored in a control system provided for the print apparatus may be used for the generation of image data.

A printer applicable to the present invention can not only be the ink jet print apparatus described above, but can also be a variety of other print apparatuses (e.g., a sublimation type). That is, the present invention can also be applied for an apparatus that prints images by using coloring agents other than ink. Further, the ink ejection type of ink jet print head is not limited to the type that uses an electrothermal conversion member, an arbitrary type can also be employed. For example, an ejection type may be employed that uses a piezoelectric device.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes.

This application claims priority from Japanese Patent Application No. 2004-235580 filed Aug. 12, 2004, which is hereby incorporated by reference herein.

What is claimed is:

1. A method for using print means to apply coloring agents to an area of a print medium and to an overrun area, extending outward from and enclosing the print medium, so as to perform printing without margins at the edges of the print medium, comprising:

a setup step of setting a single-sided printing mode, in which an image is printed by using the print means to apply coloring agents to one side of the print medium, or a double-sided printing mode, in which an image is printed by using the print means to apply coloring agents to one side and then to the other side of the print medium;

an automatic generation step of generating image data of a greater size than of the print medium, the image data calculated based on the mode set, information concerning the size of the print medium and information concerning the width of the overrun area; and a color application step of using the print means to apply the coloring agents based on the thus generated image data, wherein, at the automatic generation step, when the single-sided printing mode is set, a width of an area that overruns a first edge, which is a leading edge of the print medium in the transportation direction, differs from a width of an area that overruns a second edge, which is a trailing edge of the print medium in the transportation direction, and when the double-sided printing mode is set, it is inhibited so that the width of the area that overruns the first edge is different from the width of the area that overruns the second edge, wherein, in the single-sided printing mode, the print medium is transported in the transportation direction in the state that the first edge is the leading edge, and the image is printed in the one side of the print medium by applying the coloring agent on the one side of the print medium, and wherein, when the one-sided printing mode is set, the width of the area that overruns the first edge is smaller than the width of the area that overruns the second edge.

2. A print method according to claim 1, further comprising the step of:

performing a masking process for part of the image data that corresponds to the overrun area at the first edge, wherein, at the color application step, the coloring agent is applied by the print means based on the image data obtained during the mask process.

3. A print method according to claim 1, wherein, at the automatic generation step, the image data are generated while the width of an overrun area at a third edge, which is an end positioned in a direction perpendicular to the direction in which the print medium is transported, matches the width of an overrun area at a fourth edge, which is the other end positioned in the direction perpendicular to the direction in which the print medium is transported.

4. A print method according to claim 3, further comprising the step of:

performing a masking process for part of the image data that corresponds to the overrun area at the third edge, wherein, at the color application step, the coloring agent is applied by the print means based on the image data obtained during the mask process.

5. A print method according to claim 1, wherein, at the automatic generation step, when a single image is to be divided and printed on the reverse surface of one print medium and on the obverse surface of a succeeding print medium that together constitute a left and right double-spread page, image data corresponding to the reverse surface and the obverse surface are generated, so that images are overlapped at the left and right adjacent edges of the two surfaces.

6. A print method according to claim 5, wherein the width whereat images on the left and right double-spread pages are overlapped is equal to the width of the overrun area, or equal to a width obtained by adding the width of a binding margin to the width of the overrun area.

7. A method for printing an image on one side of a print medium, while using print means to apply coloring agents, and reversing the image-bearing print medium and using the print means to print an image on the other side of the print medium, comprising:

a setup step of setting a mode in which the print means is used to apply coloring agents to an area on the print medium and to an overrun area extending outward from and enclosing the print medium, so as to perform printing without margins at the edges of the print medium;

an automatic generation step of, when a mode has been set, based on information concerning the size of the print medium and information concerning the width of the overrun area, which automatically generates image data for an area that includes both the area of the print medium and that of the overrun area; and at a color application step, based on the thus generated image data, to apply the coloring agents to the print medium using the print means, wherein, at the color application step, the coloring agents are applied to one side and then to the other side of the print medium, so that, relative to the print medium, the position of image data corresponding to one side of the print medium to which the coloring agents are to be applied matches the position of image data corresponding to the other side, wherein, in the single-sided printing mode, the print medium is transported in the transportation direction in the state that the first edge become a leading edge, and the image is printed in the one side of the print medium by applying the coloring agent on the one side of the print medium, and wherein, when the one-sided printing mode is set, the width of the area that overruns the first edge is smaller than the width of the area that overruns the second edge, wherein the second edge is a trailing edge.

8. A method for automatically generating image data to be used in a process wherein coloring agents are applied by recording means to an area on a print medium and an overrun area extending outward from and enclosing the print medium, so as to perform printing without margins at the ends of the print medium, comprising:

a setup step of setting a single-sided printing mode, in which an image is printed by using the print means to apply the coloring agents to one side of the print medium, or a double-sided printing mode, in which images are printed by using the print means to apply the coloring agents to one side of the print means and then to the other side; and an automatic generation step of generating image data for a size greater than that of the print medium, the image data calculated based on the mode that is set, information concerning the size of the print medium and information concerning the width of the overrun area, wherein, at the automatic generation step, when the single-sided printing mode is set, a width of an area that overruns a first edge, which is a leading edge of the print medium in the transportation direction, differs from width of an area that overruns a second edge, which is a trailing edge of the print medium in the direction transported, and when the double-sided printing mode is set, it is inhibited so that the width of the area that overruns the first edge is different from the width of the area that overruns the second edge, wherein, in the single-sided printing mode, the print medium is transported in the transportation direction in the state that the first edge is the leading edge, and the image is printed in the one side of the print medium by applying the coloring agent on the one side of the print medium, and wherein, when the one-sided printing mode is set, the width of the area that overruns the first edge is smaller than the width of the area that overruns the second edge.

9. A data generation method according to claim 8, whereby, at the automatic generation step, the image data are generated while the width of an overrun area at a third edge, which is an end positioned in a direction perpendicular to the direction in which the print medium is transported, matches the width of an overrun area at a fourth edge, which is the other end positioned in the direction perpendicular to the direction in which the print medium is transported.

10. A program that permits a computer to execute a data generation method according to claim 8.

11. A print apparatus for using print means to apply coloring agents to an area on a print medium and to an overrun area, extending outward from and enclosing the print medium, so as to perform printing without margins at the edges of the print medium comprising:

setup means, for setting a single-sided printing mode in which an image is printed by using the print means to apply coloring agents to one side of the print medium, or a double-sided printing mode, in which an image is printed by using the print means to apply coloring agents to one side and then the other side of the print medium;

generation means for automatically generating image data for a size greater than the print medium, based on the mode that is set by the setup unit, information concerning the size of the print medium and information concerning the width of the overrun area; and color application means for applying the coloring agents based on the image data generated by the automatic generation means using the print means;

wherein, when the single-sided printing mode is set, the automatic generation means provides different widths for an overrun area at a first edge, which is a leading edge of the print medium in a direction transported, and for an overrun area at a second edge of the print medium which is a trailing edge of the print medium in the transportation direction, and when the double-sided printing mode is set, it is inhibited so that the width of the area that overruns the first edge is different from the width of the area that overruns the second edge, wherein, in the single-sided printing mode, the print medium is transported in the transportation direction in the state that the first edge is the leading edge, and the image is printed in the one side of the print medium by applying the coloring agent on the one side of the print medium, and wherein, at the automatic generation means, when the one-sided printing mode is set, the width of the area that overruns the first edge is smaller than the width of the area that overruns the second edge.

12. A print apparatus for printing an image on one side of a print medium by employing print means to apply a coloring agent, reversing the image-bearing print medium, and using the print means to print an image on the other side of the print medium, comprising:

an automatic generation means, for, when a mode is set in which coloring agents are applied by the print means to an area on the print medium and to an overrun area outside the print medium and printing without margins at the edges of the print medium is performed, based on information concerning a print medium size and information concerning an overrun area width to automatically generate image data for an area that includes the print medium area and the overrun area; and a color application unit for using the print means to apply the coloring agents based on the thus generated image data, wherein the generation means automatically generates image data for one side and the other side of the print medium, so that relative to the print medium, the position of an image data, corresponding to one side of the print medium matches, relative to the print medium, the position of an image data corresponding to the other side, wherein, in the single-sided printing mode, the print medium is transported in the transportation direction in the state that a first edge become a leading edge, and the image is printed in the one side of the print medium by applying the coloring agent on the one side of the print medium, and wherein, at the automatic generation means, when the one-sided printing mode is set, the width of the area that overruns the first edge is smaller than the width of the area that overruns a second edge, wherein the second edge is a trailing edge.

13. A method according to claim 1, wherein, in the double-sided printing mode, the print medium is transported in the transportation direction in the state that the first edge becomes a leading edge, and an image is printed on one side of the print medium by applying the coloring agents to the one side of the print medium, while the print medium, on the one side of which the image is printed, is transported in the transportation direction d in the state that the second edge becomes a leading edge, and an image is printed on the other side of the print medium by applying the coloring agents to the other side of the print medium.

14. A method according to claim 13, wherein, in the single-sided printing mode, the print medium is transported in the transportation direction in the state that the first edge becomes a leading edge, and an image is printed on one side of the print medium by applying the coloring agents, and wherein, at the automatic generation step, when the single-sided printing mode is set, the width of the area that overruns the first edge is smaller than the width of the area that overruns the second edge.

15. A print apparatus according to claim 11, wherein, in the double-sided printing mode, the print medium is transported in the transportation direction in the state that the first edge become a leading edge, and the image is printed in the one side of the print medium by applying the coloring agent on the one side of the print medium, and the print medium of which the image is printed to one side is transported in the transportation direction in the state that the second edge become a leading edge, and the image is printed to the other side of the print medium by applying the coloring agent.

* * * * *